(12) United States Patent
Chen

(10) Patent No.: US 12,522,019 B2
(45) Date of Patent: Jan. 13, 2026

(54) BICYCLE HUB STRUCTURE

(71) Applicant: CHOSEN CO., LTD., Chang Hua Hsien (TW)

(72) Inventor: Ching-Shu Chen, Changhua (TW)

(73) Assignee: CHOSEN CO., LTD., Chang Hua Hsien (TW)

( * ) Notice: Subject to any disclaimer, the term of this patent is extended or adjusted under 35 U.S.C. 154(b) by 788 days.

(21) Appl. No.: 17/864,833

(22) Filed: Jul. 14, 2022

(65) Prior Publication Data

US 2024/0017569 A1    Jan. 18, 2024

(51) Int. Cl.
| | |
|---|---|
| *B60B 27/02* | (2006.01) |
| *B60B 27/00* | (2006.01) |
| *B60B 27/04* | (2006.01) |
| *F16D 41/36* | (2006.01) |

(52) U.S. Cl.
CPC ........ *B60B 27/023* (2013.01); *B60B 27/0005* (2013.01); *B60B 27/047* (2013.01); *F16D 41/36* (2013.01)

(58) Field of Classification Search
CPC . B60B 27/047; B60B 27/023; B60B 27/0031; B60B 27/04; F16D 41/36; F16D 41/185
See application file for complete search history.

(56) References Cited

U.S. PATENT DOCUMENTS

| | | | |
|---|---|---|---|
| 11,220,133 B2 | 1/2022 | Walthert et al. | |
| 2021/0023878 A1* | 1/2021 | Walthert | ................. F16C 19/54 |

\* cited by examiner

*Primary Examiner* — S. Joseph Morano
*Assistant Examiner* — Alex Palmer

(57) ABSTRACT

A bicycle hub has a hub member and a chain seat. The hub member has an open containing space and a central axis protruding from the containing space. The containing space has a linking ring around the central axis, and the linking ring further has an annular linking toothed portion. An end of the chain seat has an engaging portion with a circular stopper and a circular rib and a driving ring and a first engaging toothed ring. A second engaging toothed ring is installed onto the driving ring and engaging with the first engaging toothed ring, and a driving toothed portion is formed on an outer periphery of the driving ring. A spring is disposed between the top stopping portion and the driving ring, and two ends of the spring are respectively jacketed on to the engaging protrusion and the inserting protrusion.

5 Claims, 10 Drawing Sheets

BICYCLE HUB STRUCTURE

BACKGROUND OF THE INVENTION

Field of the Invention

The present invention relates to a bicycle transmission structure, and more particularly to a bicycle hub structure.

Description of the Related Art

A conventional bicycle hub structure, such as "Bicycle component for an at least partially muscle-powered bicycle" in U.S. Pat. No. 11,220,133, discloses at least one freewheel unit comprising: a freewheel component, a support unit and at least one spring unit. The freewheel component comprises a tubular body section extending around a central axle and configured to be hollow, has a non-round outer contour for a non-rotatable and axially displaceable coupling, and a front surface with axial engagement components. The spring unit urges the freewheel component and the support unit apart in an axial direction of the central axle. The spring unit is attached to the freewheel component and to the support unit. An accommodation section is configured on an axial takeup tab, and the takeup tab is tubular in configuration, and forms a takeup flange. The accommodation section is configured on a radially peripheral surface of the takeup flange.

However, the above-mentioned conventional structure, it is not difficult to find that there are still some deficiencies, and the main reason is as follows: the conventional flywheel unit is pushed by the spring unit and engages with the flywheel component, and the spring unit with the telescopic elasticity allows the flywheel assembly to retract and escape the flywheel component, so that the flywheel unit forms a non-engagement idling state. Although the other end of the spring unit is limited and positioned by the support unit, due to the gap between the support unit and the flywheel unit, and a groove is formed above the support plate of the support unit, so that the support unit cannot form a positioning state in the chamber. Therefore, it is easy to produce offset and affect the pushing angle of the spring unit to applying on the flywheel unit, which causes the flywheel unit to be unevenly stressed and unable to move horizontally, resulting in the unsmooth movement of the flywheel unit and the flywheel component.

Therefore, it is desirable to provide a bicycle hub structure and its cover to mitigate and/or obviate the aforementioned problems.

SUMMARY OF THE INVENTION

An objective of present invention is to provide a bicycle hub structure which is capable of improving the above-mention problems.

In order to achieve the above mentioned objective, a bicycle hub structure has a hub member and a chain seat. The hub member has an open containing space at an end and a central axle protruding from the containing space. The containing space has a linking ring around the central axle, and the linking ring further has an annular linking toothed portion. The chain seat has a hollow structure and assembled with the hub member around the central axle, an end of the chain seat has an engaging portion with a circular stopper and a circular rib on an outer periphery and a driving ring and a first engaging toothed ring on an inner periphery. A second engaging toothed ring is installed onto the driving ring and engaging with the first engaging toothed ring, and a driving toothed portion is formed on an outer periphery of the driving ring and engaging with the annular linking toothed portion of the linking ring. The driving ring further has an engaging protrusion on an inner periphery. The first engaging toothed ring further has a top stopping portion with an inserting protrusion facing the first engaging toothed ring. A spring is disposed between the top stopping portion and the driving ring, and two ends of the spring are respectively jacketed on to the engaging protrusion and the inserting protrusion.

Other objects, advantages, and novel features of invention will become more apparent from the following detailed description when taken in conjunction with the accompanying drawings.

DETAILED DESCRIPTION OF THE PREFERRED EMBODIMENT

Figure 1:
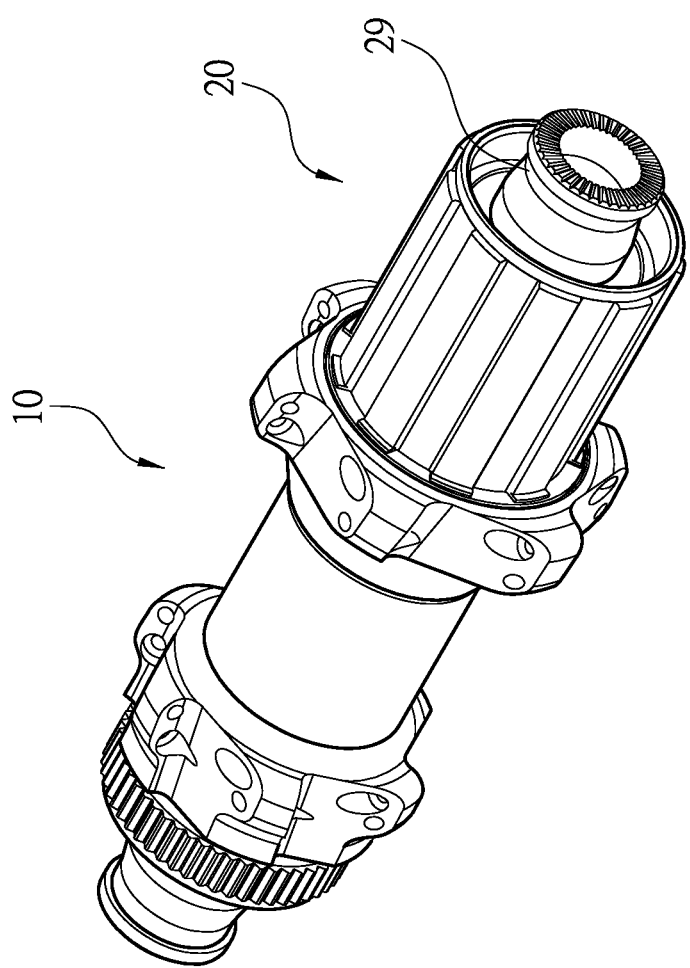
FIG. 1 is a three-dimensional drawing of a preferred embodiment according to an embodiment of the present invention.
Figure 2:
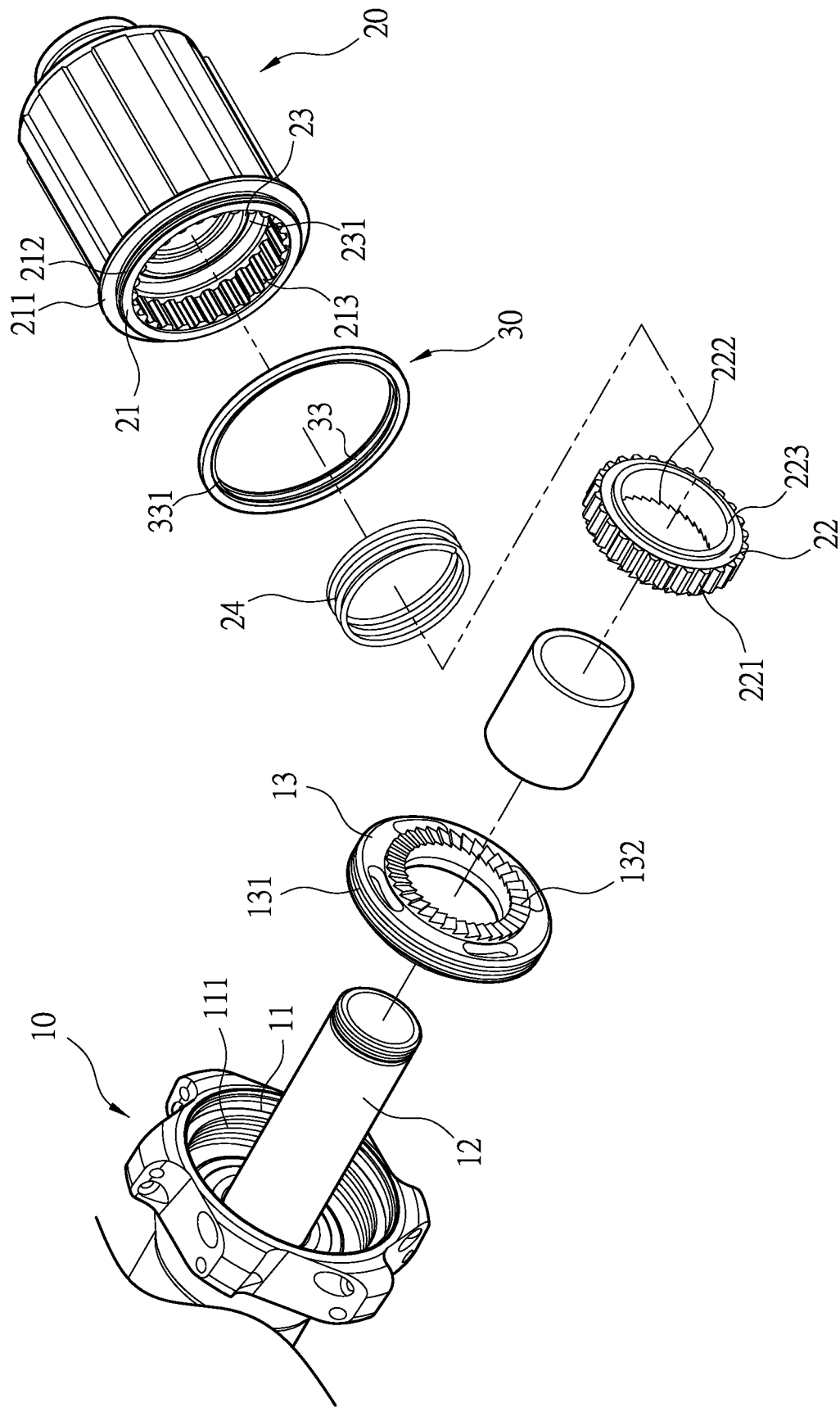
FIG. 2 is an exploded drawing of the preferred embodiment according to the present invention.
Figure 3:
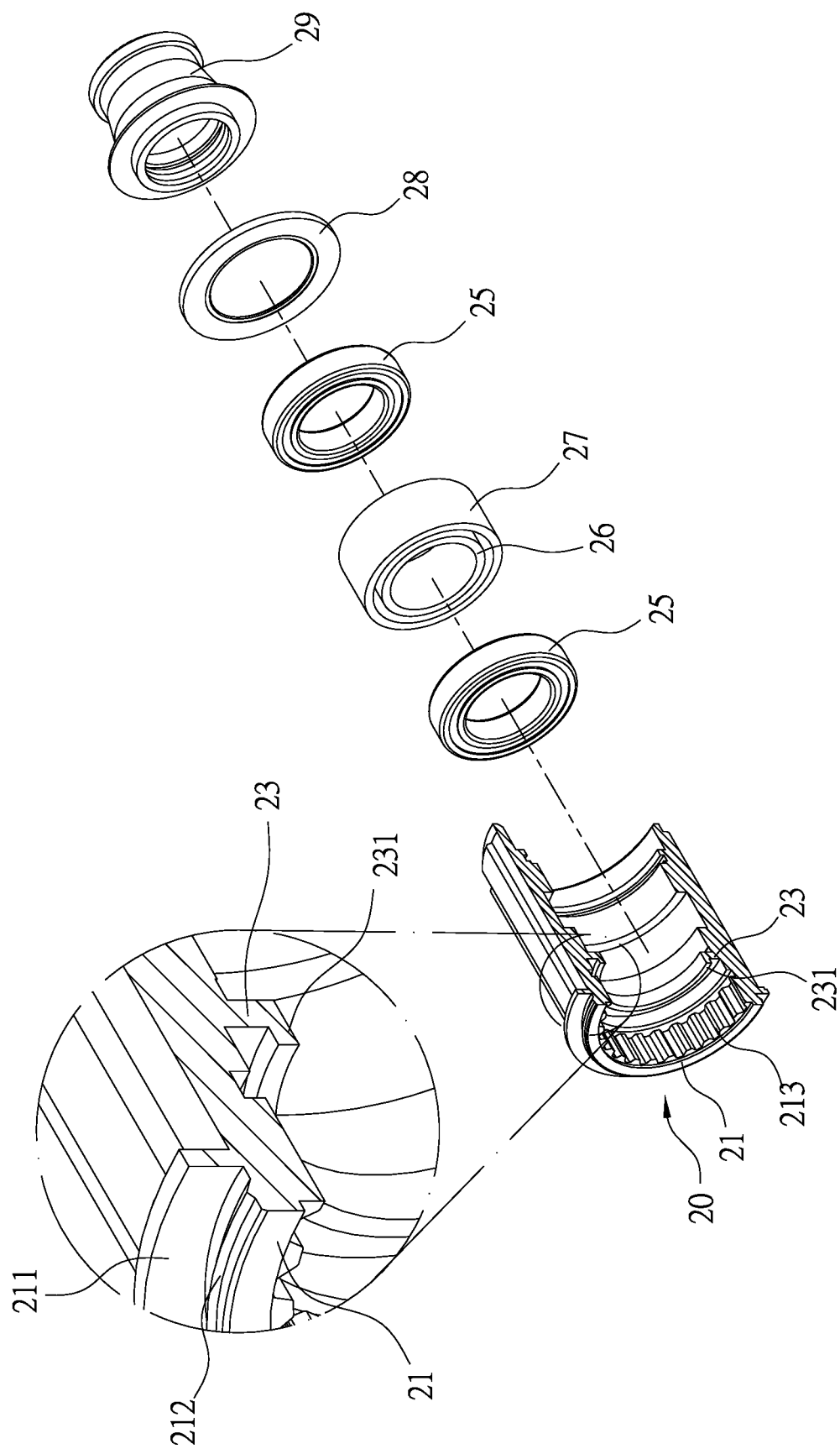
FIG. 3 is an exploded and local detail drawing of the chain seat of the preferred embodiment according to the present invention.
Figure 4:
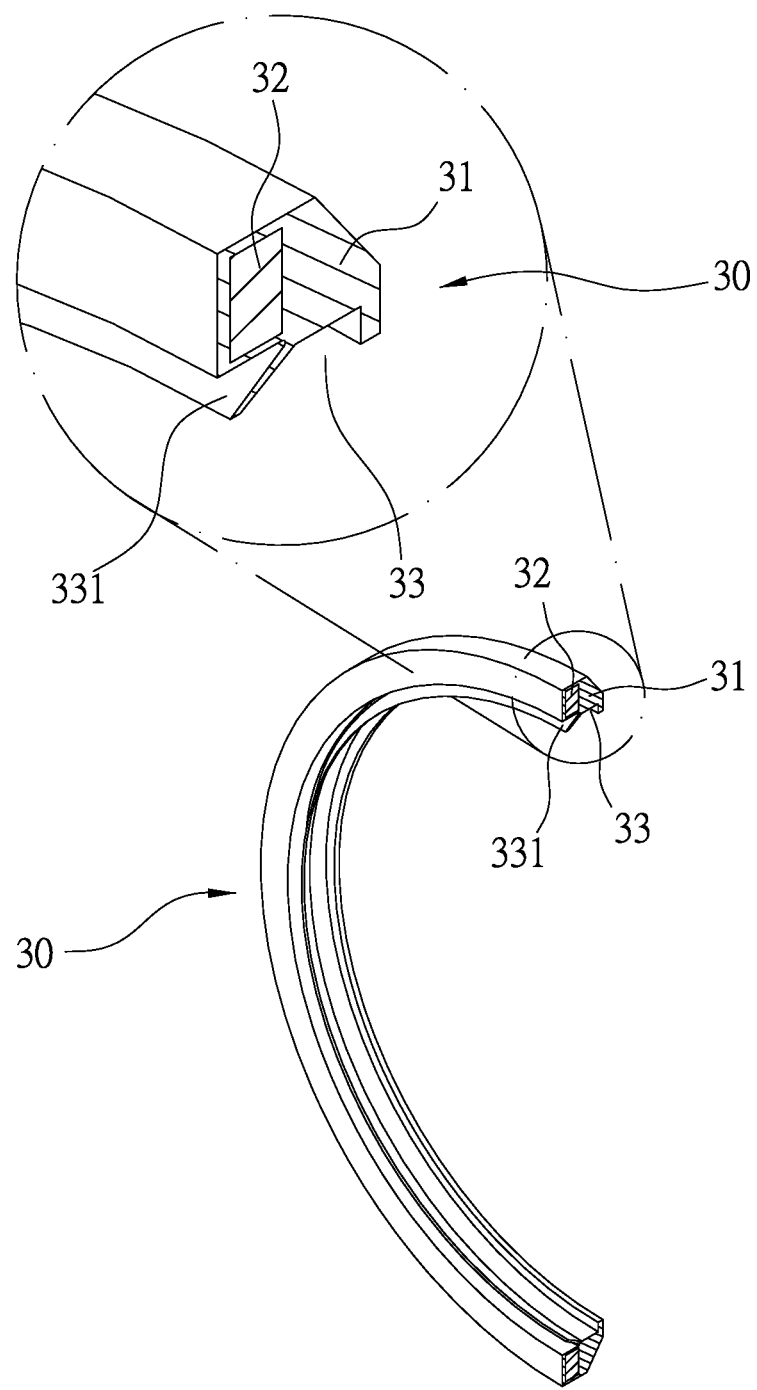
FIG. 4 is a schematic drawing of the oil seal gasket of the preferred embodiment according to the present invention.

First, please refer to FIG. 1 to FIG. 4. A bicycle hub structure comprises: a hub member 10, a chain seat 20 and an oil seal gasket 30. The hub member 10 has an open containing space 11 with an inner threaded section 111 at an end. The hub member 10 also has a central axle 12 protrudes from the containing space 11, and the containing space 11 comprises a linking ring 13 around the central axle 12. The linking ring 13 further has an outer threaded section 131 locking the linking ring 13 into the containing space 11 along the central axle 12, and an annular linking toothed portion 132.

The chain seat 20 has a hollow structure and is assembled with the hub member 10 around the central axle 12. An end of the chain seat 20 has an engaging portion 21 with a circular stopper 211 and a circular rib 212 on an outer periphery, and a driving ring 22 and a first engaging toothed ring 213 on an inner periphery. Furthermore, a second engaging toothed ring 221 is installed onto the driving ring 22 and engages with the first engaging toothed ring 213. A driving toothed portion 222 is formed on an outer periphery of the driving ring 22 and engages with the annular linking toothed portion 132 of the linking ring 13. The driving ring 22 further has an engaging protrusion 223 on an inner periphery.

The chain seat 20 further has a top stopping portion 23 with an inserting protrusion 231 facing the first engaging toothed ring 213. A spring 24 is disposed between the top stopping portion 23 and the driving ring 22, and two ends of the spring 24 are respectively jacketed on to the engaging protrusion 223 and the inserting protrusion 231, which can improve the clutch stability of the driving ring 22 and the linking ring 13.

Moreover, the chain seat 20 further has two lubricating bearings 25 disposed on the inner periphery of the chain seat 20. One of the lubricating bearings 25 pushes against the top stopping portion 23, and a first sleeve 26 and a second sleeve 27 with different diameters are disposed between the two lubricating bearings 25. The first sleeve 26 is sleeved onto the central axle 12, and the chain seat 20 has a washer 28 that limits the other lubricating bearings 25 at the side opposite from the engaging portion 21, and a cap 29 is disposed at the end.

Furthermore, an oil seal gasket 30 is installed between the containing space 11 of the hub member 10 and the engaging portion 21 of the chain seat 20. The oil seal gasket 30 has a reinforcing portion 31 at one side and a hardening ring 32 at another side. An oil groove 33 is disposed on an inner periphery of the oil seal gasket 30 and engages with the circular rib 212 of the chain seat 20, and the oil groove 33 further comprises a sealing fin 331 facing the chain seat 20.

Figure 5:
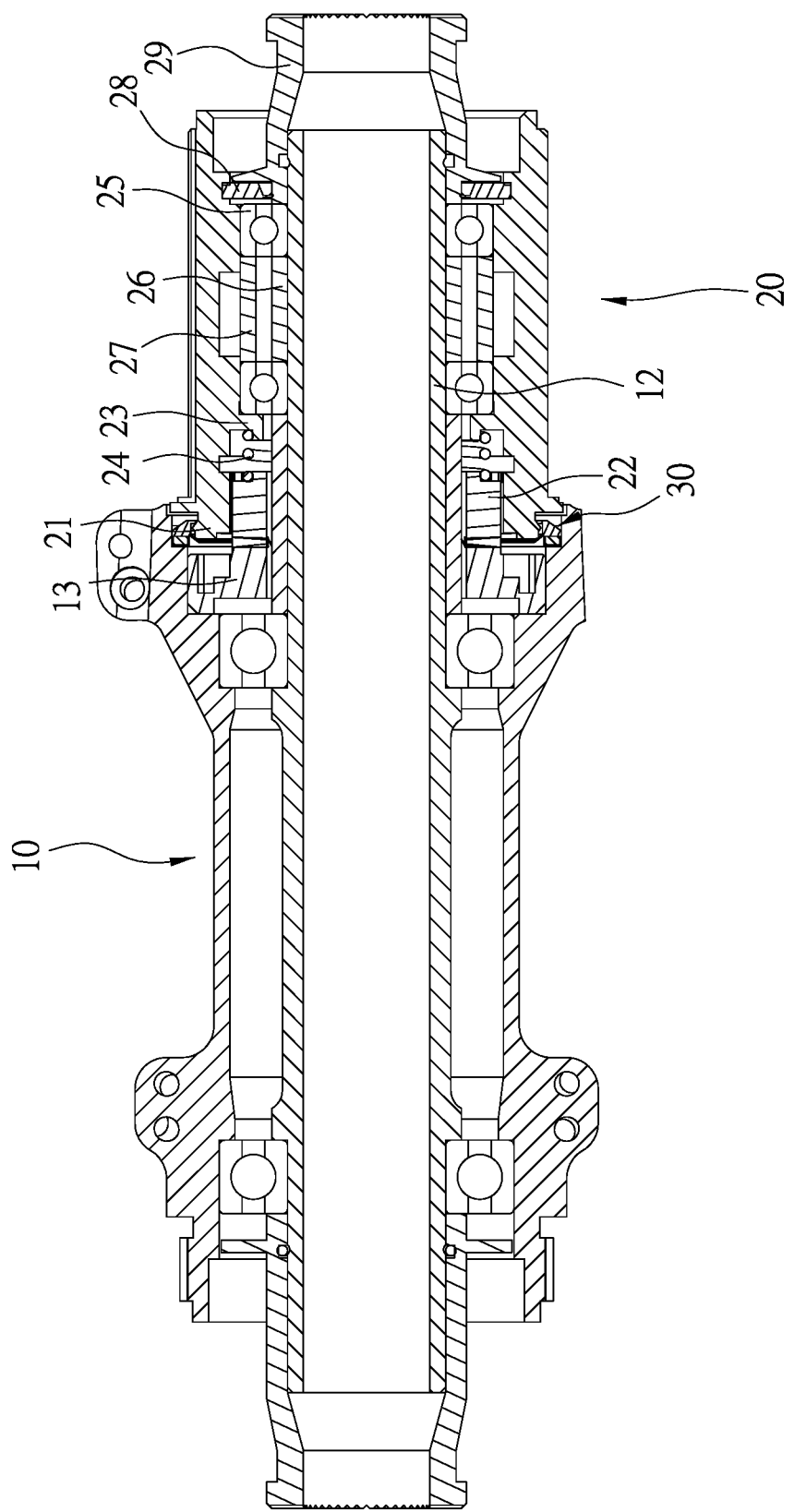
FIG. 5 is a cross-sectional view of the preferred embodiment according to the present invention.
Figure 6:
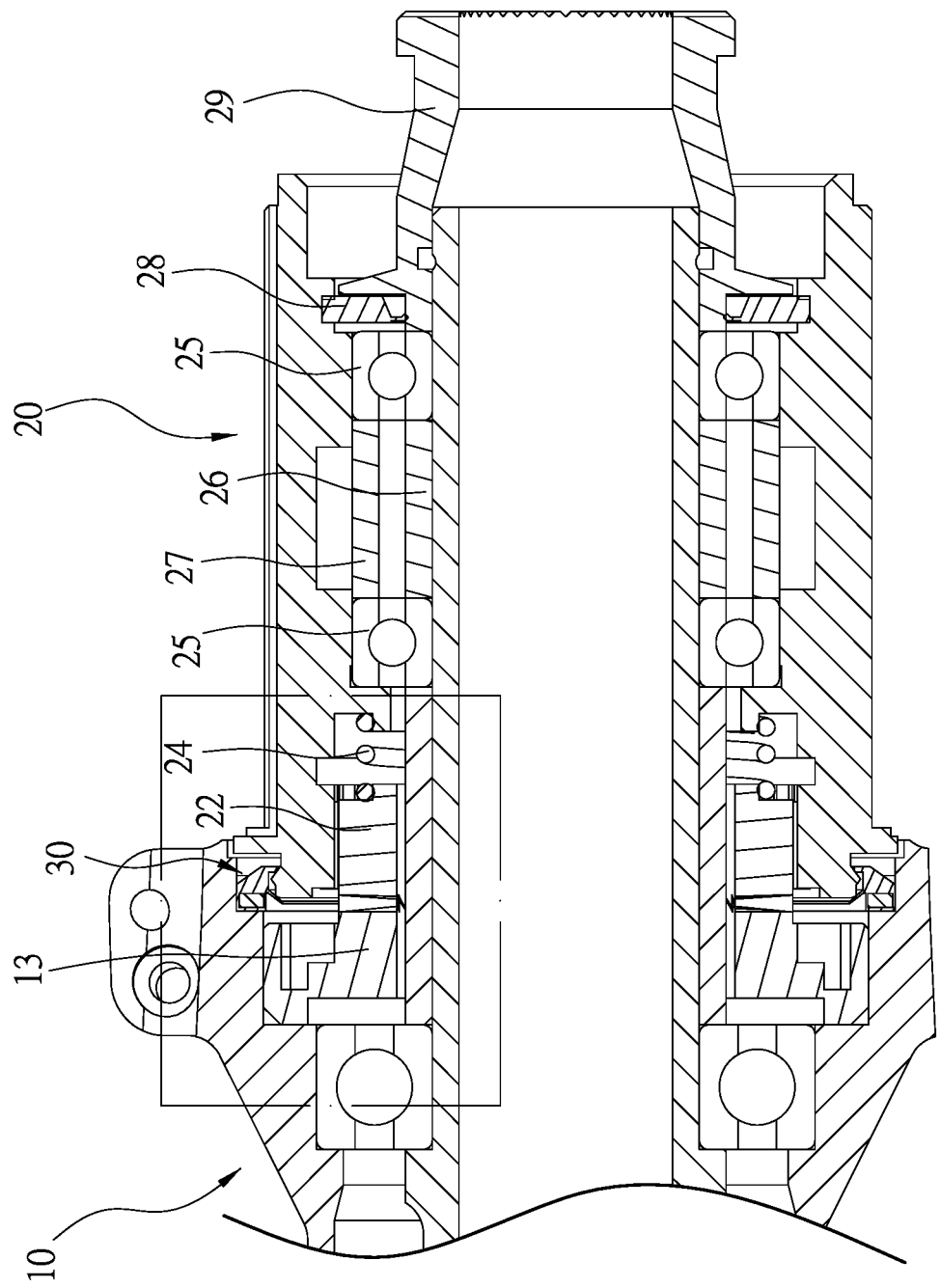
FIG. 6 is a cross-sectional enlarged view of the preferred embodiment according to the present invention.
Figure 7:
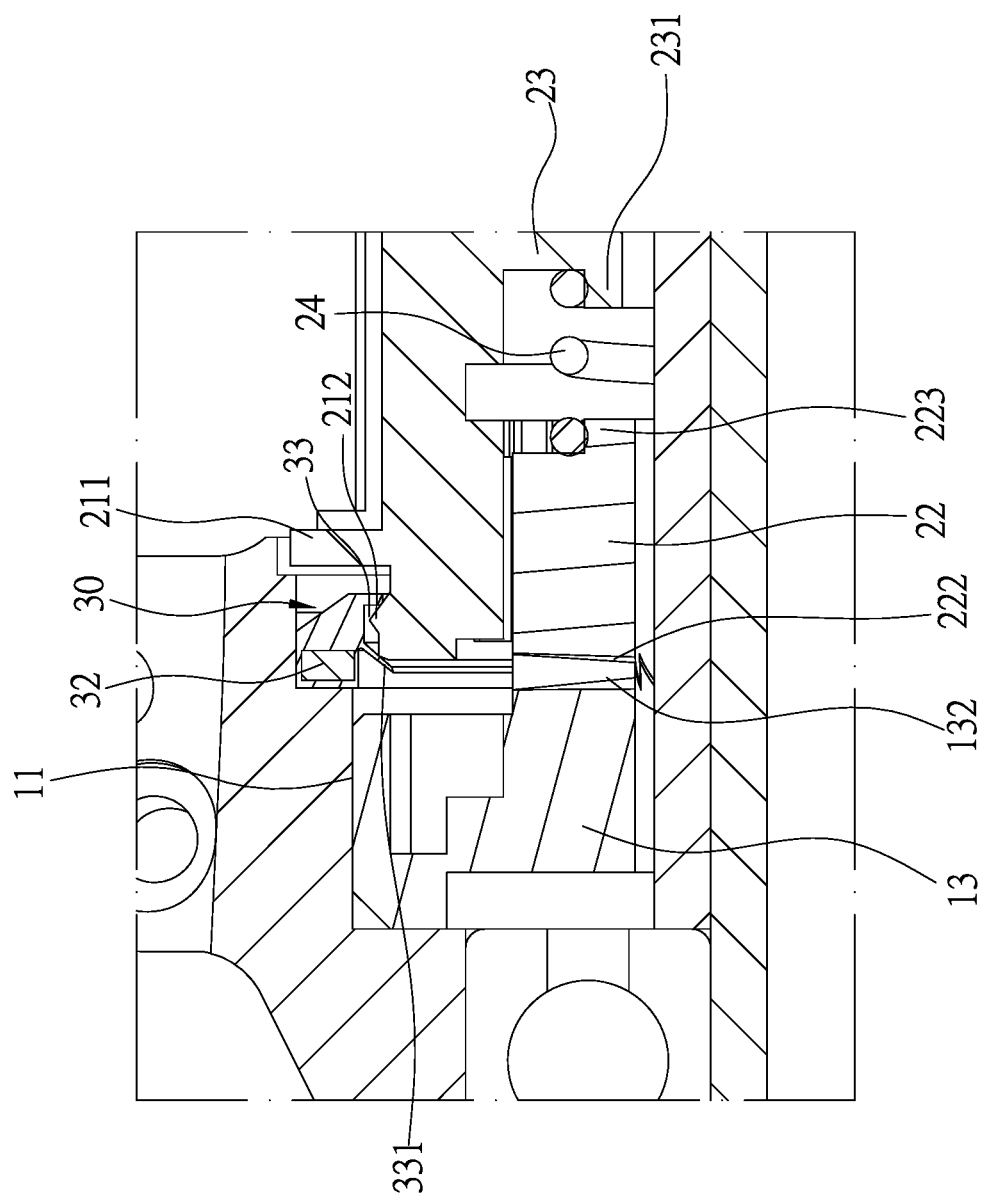
FIG. 7 is a local enlarged drawing of the preferred embodiment according to the present invention.

For the composition of the structure of the embodiment of the present invention, please refer to FIGS. 1 to 4 and in conjunction with FIGS. 5, 6 and 7. The containing space 11 of the hub member 10 is screwed with the linking ring 13, and the chain seat 20 is inserted onto the two lubricating bearings 25 and the first and second sleeves 26, 27 with one end opposite the engaging portion 21. One of the lubricating bearings 25 is positioned against the top stopping portion 23, and the first and second sleeves 26 and 27 are disposed between the two lubricating bearings 25. The second sleeve 27 has a larger diameter than the first sleeve 26 and is assembled on the inner surface of the chain seat 20, while the inner diameter of the first sleeve 26 is aligned with the shaft holes of the two lubricating bearings 25, and then the washer 28 is inserted onto the other lubricating bearing 25.

The engaging portion 21 of the chain seat 20 firstly accepts the spring 24, and one end of the spring 24 abuts the top stopping portion 23 and sleeves onto inserting protrusion 231. The second engaging toothed ring 221 of the driving ring 22 is assembled into the chain seat 20 along the first engaging toothed ring 213, and the engaging protrusion 223 is used to secure and position the spring 24, so that the spring 24 is stably confined in the chain seat 20 and provides a stable telescopic movement to the driving ring 22.

The oil seal gasket 30 is sleeved on the outside of the engaging portion 21, the enforced portion 31 faces the circular stopper 211, the oil groove 33 is aligned and fixed with the circular rib 212, and the sealing fin 331 on the side of the oil groove 33 presses outward against the end of the chain seat 20, so that the chain seat 20 can be combined onto the hub member 10 along the central axle 12. The engaging portion 21 of the chain seat 20 is embedded in the containing space 11 of the hub member 10, the outer periphery of the oil seal gasket 30 pushes close to the inner periphery of the containing space 11, the spring 24 pushes against the driving ring 22, the driving toothed portion 222 engages with the annular linking toothed portion 132 of the linking ring 13, and finally the cap 29 is assembled at another end of the chain seat 20 along the central axle 12. Thereby, the composition of the bicycle hub structure is completed.

In the actual use, the outer periphery of the chain seat 20 is designed to match with the flywheel set of the bicycle. When the bicycle is driven forward by stepping forward, the chain seat 20 rotates in conjunction with the pedaling of the crank and the pedals. The chain seat 20 is engaged with the linking ring 13 through the driving ring 22, so as to transmit the power obtained by the chain seat 20 to the hub member 10 to achieve the synchronous rotation state of the hub member 10. Alternatively, when pedaling stops during riding or when pedaling in reverse, since the tooth engaging directions of the driving toothed portion 222 of the driving ring 22 and the annular linking toothed portion 132 of the linking ring 13 are different, the annular linking toothed portion 132 cannot be engaged and linked together, and jumps and compresses the spring 24 to shrink inward to create an escape space, so that the chain seat 20 is in an idling state. When stepping forward with the pedals again, the spring 24 instantly push against the driving ring 22 and quickly engages with the linking ring 13 to make the hub member 10 to rotate synchronously.

Figure 8:
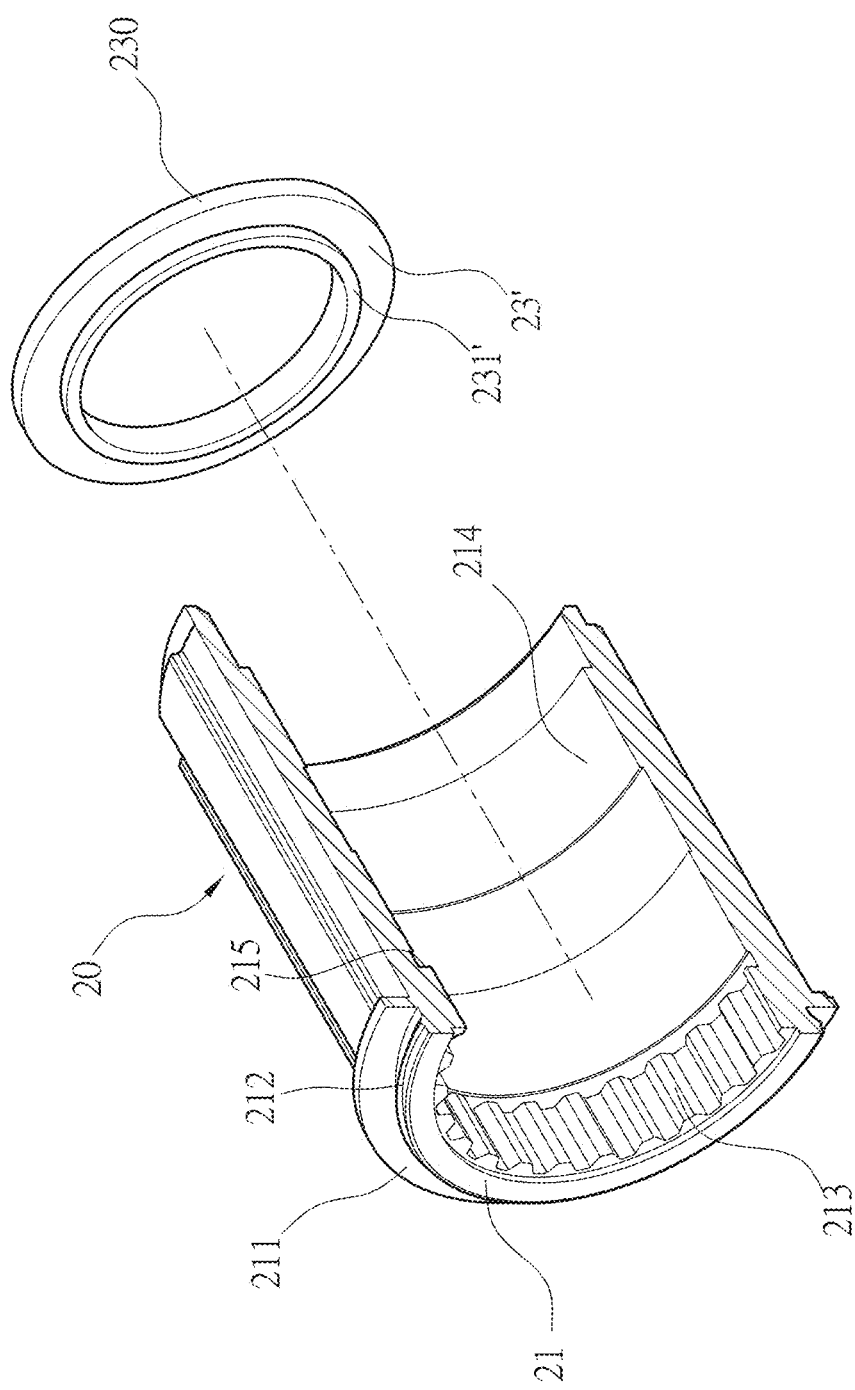
FIG. 8 is an exploded drawing of another embodiment according to this invention.
Figure 9:
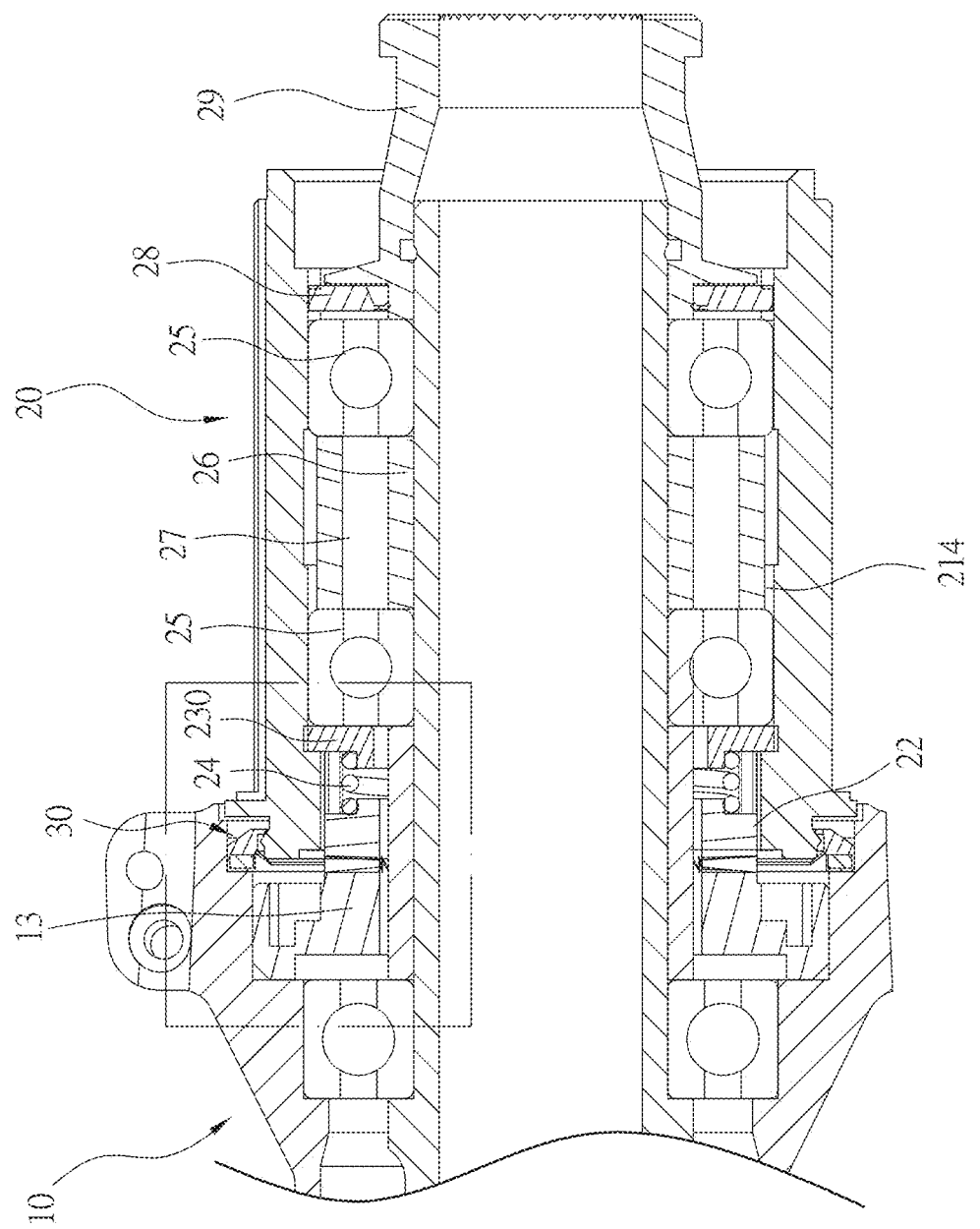
FIG. 9 is a cross-sectional view of another embodiment of the invention.
Figure 10:
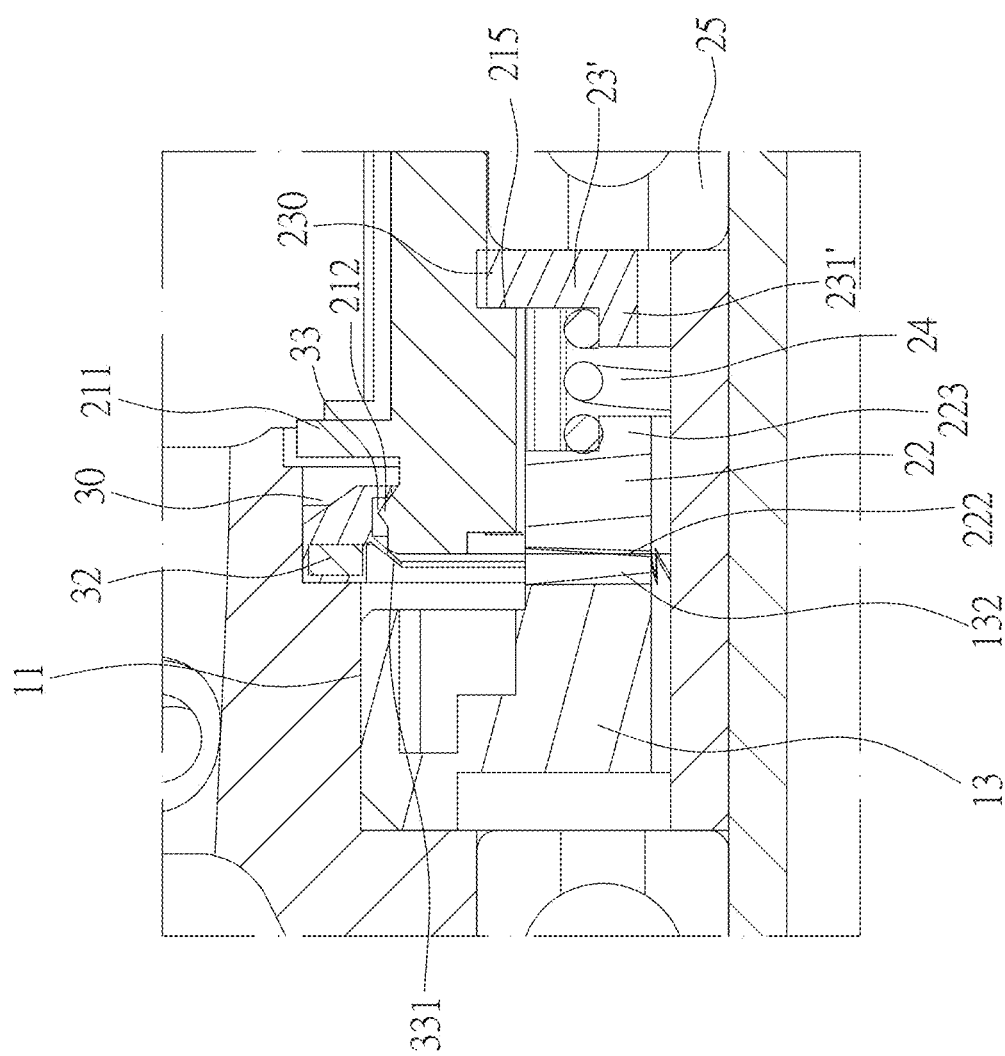
FIG. 10 is a local enlarged drawing of another embodiment of this invention.

For another embodiment, as shown in the FIGS. 8, 9, and 10, the chain seat 20 is expanded at the rear section of the first engaging toothed ring 213 to form an enlarged slot 214, and the enlarged slot 214 and the edge of the first engaging toothed ring 213 together form a limiting step 215 for being mounted with the top stopping portion 23' having a limiting ring 230 and the inserting protrusion 231'. Meanwhile, the enlarged slot 214 is configured for being mounted with two enlarged lubricating bearings 25. Accordingly, the inserting protrusion 231' of the limiting ring 230 is assembled into the chain seat 20 toward the first engaging toothed ring 213 and pushed forward against the limiting step 215. Then, a lubricating bearing 25 is assembled adjacent to the limiting ring 230, the first and second sleeves 26, 27 and another lubricating bearing 25 are assembled in sequence, and a washer 28 is further embedded to limit the positioning, so as to complete the composition of another embodiment of the chain seat 20. Afterward, with the top stopping portion 23', the enlarged slot 214 in the chain seat 20 accepts the combination of the limiting ring 230 to enlarge the lubricating bearings 25 to further improve the rotation, stability and smoothness of the chain seat 20, to achieve more linear and dense power connection and transmission.

With the above-mentioned specific embodiments, the following benefits can be obtained: the top stopping portion 23 mounted inside the chain seat 20 is configured for pushing the spring 24, and the inserting protrusion 231 of the top stopping portion 23 extends horizontally and is fastened with one end of the spring 24, and the other end of the spring 24 is fastened with the engaging protrusion 223 of the driving ring 22, such that the spring 24 is assembled between the top stopping portion 23 and the driving ring 22 to provide linear and stable telescopic action, which achieves precise and accurate clutch action between the driving ring 22 and the linking ring 13, to improve the power connection and transmission smoothness of the chain seat 20 and the hub member 10 and further enhance the safety of cycling.

Although the present invention has been explained in relation to its preferred embodiment, it is to be understood that many other possible modifications and variations can be made without departing from the spirit and scope of invention as hereinafter claimed.

What is claimed is:

1. A bicycle hub structure comprising:
   a hub member with an open containing space at an end and a central axle protruding from the containing space, the containing space comprising a linking ring around the central axle, the linking ring further comprising an annular linking toothed portion;

a chain seat having a hollow structure and assembled with the hub member around the central axle, an end of the chain seat having an engaging portion with a circular stopper and a circular rib on an outer periphery, and a driving ring and a first engaging toothed ring on an inner periphery; a second engaging toothed ring is installed onto the driving ring and engaging with the first engaging toothed ring, a driving toothed portion is formed on an outer periphery of the driving ring and engages with the annular linking toothed portion of the linking ring, and the driving ring further has an engaging protrusion on an inner periphery;

wherein the first engaging toothed ring further has a top stopping portion with an inserting protrusion facing the first engaging toothed ring;

a spring disposed between the top stopping portion and the driving ring, two ends of the spring respectively jacketed on to the engaging protrusion and the inserting protrusion;

wherein the chain seat further comprises two bearings disposed on the inner periphery of the chain seat, one of the bearings pushing against the top stopping portion, and a first sleeve and a second sleeve with different diameters are disposed between the two bearings; wherein the first sleeve is sleeved onto the central axle, and a washer limits one of the two bearings at a side opposite the engaging portion, and the chain seat further comprises a cap at the end.

2. The bicycle hub structure as claimed in claim 1, wherein the containing space of the hub member further has an inner threaded section, and the linking ring further has an outer threaded section locking the linking ring into the containing space.

3. The bicycle hub structure as claimed in claim 1, wherein the top stopping portion is formed at the inner periphery of the chain seat.

4. The bicycle hub structure as claimed in claim 1, wherein the inner periphery of the chain seat further comprises a slot after the first engaging toothed ring for accepting at least one of the bearings, and a limiting step is disposed between the slot and the first engaging toothed ring for accepting a limiting ring comprising the top stopping portion and the inserting protrusion.

5. The bicycle hub structure as claimed in claim 1 further comprising an oil seal gasket installed between the containing space of the hub member and the engaging portion of the chain seat, the oil seal gasket having a reinforcing portion at one side and a hardening ring at another side, an oil groove disposed on an inner periphery of the oil seal gasket and engaging with the circular rib of the chain seat, and the oil groove further comprises a sealing fin facing the chain seat.

\* \* \* \* \*